Sept. 20, 1960   N. A. KIMMEL ET AL   2,952,972
ROCKET MOTOR AND METHOD OF OPERATING SAME
Filed Sept. 9, 1957   4 Sheets-Sheet 1

INVENTORS
N. A. KIMMEL
J. P. ALDEN
BY
Hudson & Young
ATTORNEYS

Sept. 20, 1960 N. A. KIMMEL ET AL 2,952,972
ROCKET MOTOR AND METHOD OF OPERATING SAME
Filed Sept. 9, 1957 4 Sheets-Sheet 2

INVENTORS
N. A. KIMMEL
J. P. ALDEN
BY
Hudson & Young
ATTORNEYS

Sept. 20, 1960     N. A. KIMMEL ET AL     2,952,972
ROCKET MOTOR AND METHOD OF OPERATING SAME
Filed Sept. 9, 1957     4 Sheets-Sheet 3
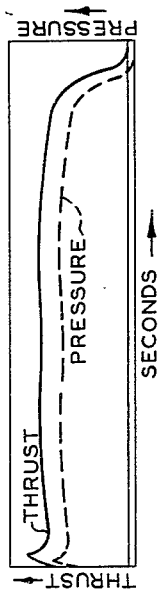
FIG. 7-A
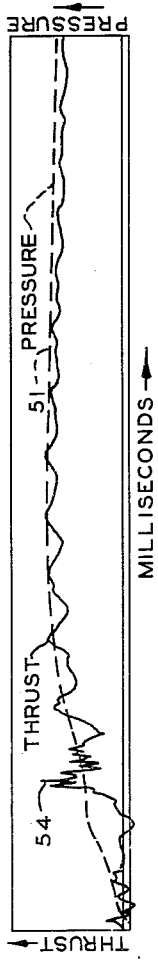
FIG. 7-B
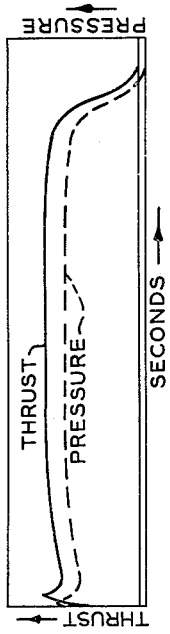
FIG. 8-A
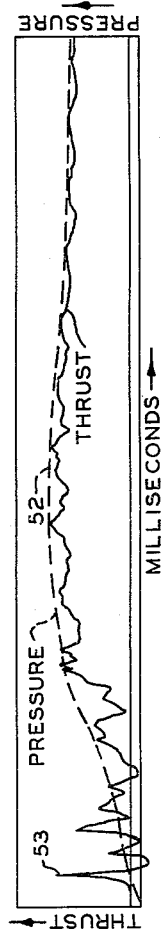
FIG. 8-B
INVENTORS
N. A. KIMMEL
J. P. ALDEN
BY Hudson & Young
ATTORNEYS Sept. 20, 1960 N. A. KIMMEL ET AL 2,952,972
ROCKET MOTOR AND METHOD OF OPERATING SAME
Filed Sept. 9, 1957 4 Sheets-Sheet 4
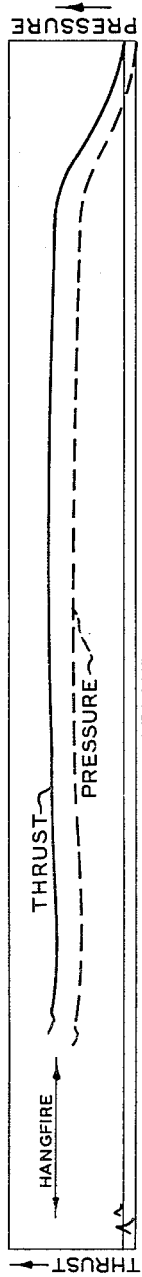
FIG. 9-A
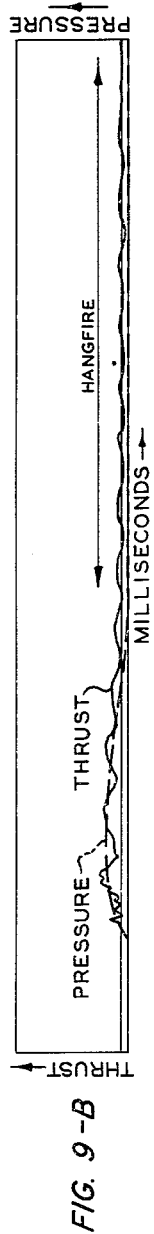
FIG. 9-B
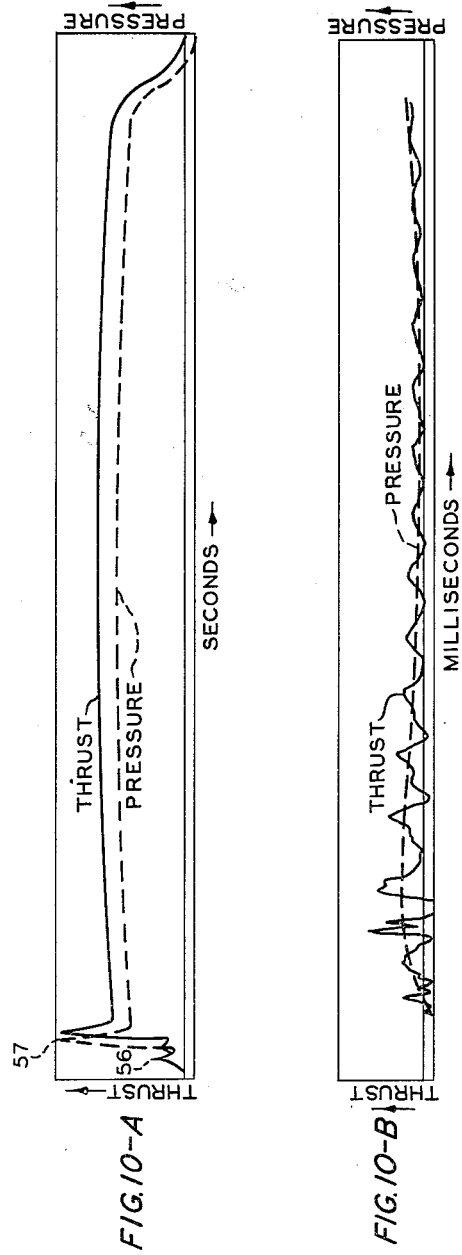
FIG. 10-A
FIG. 10-B
INVENTORS
N. A. KIMMEL
J. P. ALDEN
BY
*Hudson & Young*
ATTORNEYS

United States Patent Office 2,952,972
Patented Sept. 20, 1960

2,952,972
ROCKET MOTOR AND METHOD OF OPERATING SAME

Norman A. Kimmel, Waco, Tex., and John P. Alden, Princeton, N.J., assignors, by mesne assignments, to the United States of America as represented by the Secretary of the Air Force Filed Sept. 9, 1957, Ser. No. 682,991

1 Claim. (Cl. 60—35.6)

This invention relates to a reaction propulsion device such as a rocket motor that is charged or loaded with solid propellant and especially adapted for assisting the take-off of aircraft. In another aspect it relates to a method of operating such a rocket motor.

Rocket motors utilizing solid propellants, such as the type with which this invention is concerned, generally comprise a cylindrical casing defining a combustion chamber loaded or charged with solid propellant which upon ignition and burning generates large volumes of gases at high pressures and temperatures. Complete ignition of the propellant in a short time may be attained by rapidly increasing the combustion chamber pressure by means of a blowout or starter disc positioned across a Venturi-type passage in an outlet nozzle located at the rear or aft end of the chamber. Following the functioning of the starter disc, these gaseous products are discharged at high velocities from the chamber via the nozzle passage, thus developing propulsive thrust which propels the rocket motor forward.

Applications of this type of rocket motor include artillery rockets, boosters, missile sustainers, assisting the take-off of aircraft, and non-propulsive systems such as gas generators. The rocket motor of this invention is especially adapted for assisting the take-off of aircraft, rocket motors used for this service being known as JATO units; but it is to be understood that this invention is not to be limited to such service, although this invention will be illustrated as applied thereto.

This invention relates to the solution of inherent problems of operating rocket motors, charged with solid propellant, throughout a wide range of temperature conditions. Service requirements for these rocket motors are severe, and military acceptance of a particular rocket motor design requires proven, satisfactory and reproducible operation in the temperature range of from about −75° F. to +170° F., or more generally in the range of from −60° F. to +160° F.

Generally, solid propellants are more difficult to ignite and burn at the lower end of the temperature range, i.e., −60° F. to −75° F., than at the higher temperatures. To insure satisfactory ignition at the lower temperatures, the normal practice is to employ greater amounts of igniter materials in order to provide igniter decomposition products having a high energy value. Unfortunately, the use of these same high energy igniter mixtures to ignite solid propellants at higher temperatures often produces an undesirably high combustion chamber pressure drop following the functioning of the starter disc, as evidenced by high thrust peaks on thrust-time curves. Moreover, even the use of high energy igniter mixtures at lower temperatures does not insure satisfactory ignition of solid propellants but often results in hangfires or misfires.

Many solid propellants are inherently difficult to ignite, especially at low temperatures, because their heat transfer coefficients are low and they have relatively high auto-ignition temperatures. Accordingly, in order to satisfactorily ignite solid propellants it is necessary to provide sufficient heat to maintain a combustion or hot zone below the surface of the propellant. In the case where ammonium nitrate-binder composite propellants are employed, where the auto-ignition temperature is about 600° F., this hot zone is approximately 1/8 inch thick. When this hot zone is established over the entire exposed burning surface of the propellant, equilibrium burning conditions are established and the uniform consumption of the propellant is possible. In the case of the ammonium nitrate-binder composite propellants, equilibrium burning conditions necessitate the production of adequate amounts of igniter decomposition products for about the first 250–600 milliseconds after the igniter is fired; when this equilibrium burning condition is established, the ignition phase is completed. We have discovered that the use of a starter disc alone does not insure establishment of equilibrium burning conditions because, following the rupture of the starter disc, the pressure in the combustion chamber drops at an excessive rate which often prevents the attainment of equilibrium operating pressures in the combustion chamber during the ignition phase; as a result, the ignition of solid propellants is often unsatisfactory, especially at low temperatures, even when high energy igniter mixtures are employed.

Accordingly, it is an object of this invention to provide a novel reaction propulsion device such as a rocket motor. Another object is to provide a novel method of operating such a device. Another object is to provide means whereby satisfactory and reproducible ignition of solid propellants can be attained throughout a wide temperature range, viz., −75° F. to +170° F., even with the use of high energy igniter mixtures. Another object is to minimize the rate at which the pressure drops in the combustion chamber of a rocket motor, charged with solid propellant, following the rupture of a starter disc. A further object is to provide means whereby the occurrence of hangfires and misfires is minimized during operation of a rocket motor charged with solid propellant. Other objects and advantages will become apparent to those skilled in the art from the following discussion, appended claim, and accompanying drawing in which:

Figures 5–10 are simplified pressure-time and thrust-time curves illustrating operational characteristics of our invention.

Broadly, the rocket motors of this invention, charged with solid propellant, are operated by igniting the propellant in a confined combustion chamber with known ignition means whereby igniter decomposition products are produced in the chamber and ignite the propellant with the consequent generation of combustion gases at high temperatures and pressures. The elevated pressure causes the functioning of a blowout or starter disc positioned across a Venturi-type passage in an outlet nozzle located in the rear or aft end of the chamber when the pressure therein reaches a predetermined value. Immediately after the starter disc functions, the flow of gases from the chamber via the nozzle passage is controlled so that the rate and magnitude of the drop of pressure in the chamber is minimized in order that the equilibrium operating pressure in the chamber is maintained during the ignition phase to insure satisfactory ignition of the propellant. This is accomplished by progressively increasing the effective throat area of the nozzle passage during the ignition phase. After the equilibrium operating pressure (e.g., 1000 p.s.i.) has been established and maintained during this critical time, the effective throat area of the nozzle passage remains substantially constant.

To this end, the rocket motor of our invention is provided with a thin axially perforated member which is positioned across the Venturi-type passage of the nozzle at a point upstream from the location of the blowout disc. Following the rupture of the blowout disc, the combustion gases generated by the burning propellant flow through the axial perforation, thereby progressively enlarging the same by an eroding and melting action until finally the gas flow through the nozzle passage is solely controlled by the effective throat area defined by the constricted portion of the metal nozzle.

The terminology "two-step starter disc system" as used herein refers to the primary and starter disc system of this invention.

Figure 1:
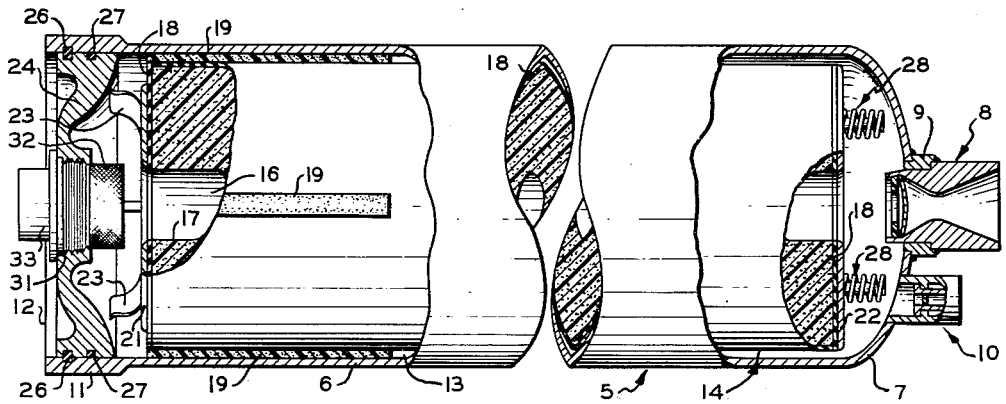
Figure 1 is an elevational view partly in section of a rocket motor illustrating our invention.

Referring now to the drawing, in which like parts have been designated with like reference characters, and to Figure 1 in particular, a rocket motor generally designated 5 as illustrated and represents one form of a jet propulsion device which may be employed, for example, to assist the take-off of aircraft. Rocket motor 5 has a cylindrical casing 6 having a reduced aft portion 7 which is provided with an axial opening in which is inserted an outlet nozzle generally designated 8 which can be secured to reduced aft portion 7 by an annular lock member 9 or the like. Although nozzle 8 is illustrated as being separable, it is, of course, within the scope of this invention to make the nozzle integral wtih the reduced aft portion 7. The latter is provided with one or more safety plug attachments generally designated 10 which are capable of releasing excessive pressure from the combustion chamber in a manner well known to those skilled in the art. The other or head end of casing 6 can be in the form of an enlarged portion 11 and this end of the casing is closed by a closure or cap member 12.

The casing 6 defines a cylindrical combustion chamber 13 which is loaded with a grain of solid propellant generally designated 14. This particular grain 14 is cylindrical in shape and can have an outer diameter slightly smaller than the inner diameter of casing 6. Grain 14 is of the internal-burning type by reason of an axial perforation 16 which defines an internal burning surface 17. The outer cylindrical surface and the two ends of the grain 14 are covered with restricting material 18 which confines the burning of the grain to the exposed burning surface 17. A purality of resilient pads or strips 19 made, for example, of sponge rubber, can be placed between the head portion of the grain 14 and the adjacent portion of the casing 6. These strips 19 can be adhesively bonded to the outer cylindrical surface of grain 14 and the inner surface of casing 6; it is to be understood, however, that although such an arrangement is preferred, any suitable means can be employed to support the grain 14 within the chamber 13. Retaining end plates 21 and 22 are attached to the ends of the grain 14 adjacent the outer faces of the restricting material 18 attached to these ends. The plates 21 and 22 and the restricting material 18 adjacent thereto have axial openings and which are in alignment with the perforation 16. Secured to the head retaining plate 21 are outer-extending prongs or legs 23 which are adapted to register with a grain retaining assembly 24 which can be made, for example, of aluminum and which can be secured to the inside of the head end of casing 6 by a key 26 and a sealing ring 27. The aft retaining plate 22 can have secured to its outer surface a plurality of spring members 28, each of which comprises a prong surrounded by a compression spring which is adapted to come into contact with the inside of the reduced aft portion 7.

Inserted within an axial opening in closure member 12 and threadedly engaging retaining assembly 24 is an igniter plug 31. Attached to the inner end of igniter plug 31 is a perforated container 32, such as a wire basket, the perforations of which are preferably closed by rubbery or plastic material, such as cellulose acetate plastic molding compound or other suitable covering material, which will rapidly soften or rupture upon being subjected to heat and/or pressure. This perforated container is described and claimed in the copending U.S. application Serial No. 605,904, filed August 23, 1956 by O. D. Ratliff. An igniter material is disposed within the container 32 in contact with suitable electro-responsive means, such as squibs or matches. The igniter material is preferably in granular or pelleted form, each discrete particle comprising powdered metal, powdered oxidizing material and ethylcellulose (which acts as a binding agent). While it is not intended to limit this invention to any particular igniter material, and any suitable igniter material can be utilized, e.g., black powder, the aforementioned granular or pelleted igniter material is especially useful in the practice of our invention, such igniter material being disclosed and claimed in copending U.S. application Serial No. 592,995, filed June 21, 1956 by L. G. Herring. Ignition sustaining material in the form of a disc can also be disposed in container 32, which material furnishes additional igniter decomposition products for a period of time in addition to that time during which decomposition products are furnished by the pelleted igniter material. For example, the pelleted igniter material may burn for about 150 milliseconds and the disc of sustainer material may burn for a period of about 500 milliseconds. This sustaining igniter material is disclosed and claimed in copending U.S. application Serial No. 591,340, filed June 14, 1956, by B. R. Adelman. The decomposition products from all the igniter material flow into the combustion chamber 13, following the rupture or melting of the coating material on the container 32.

Although the rocket motor illustrated in Figure 1 is charged with an internal-burning grain of propellant, it is within the scope of our invention to employ external-burning grains and internal-external-burning grains. Moreover, where the grains are provided with internal-burning surfaces, the latter may be defined by star-type perforations as well as other known types of perforations.

Figure 2:
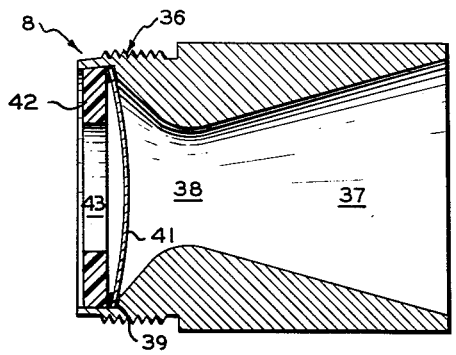

Referring now again to the drawing, and to Figure 2 in particular, there is illustrated an enlarged cross-sectional view of the outlet nozzle illustrated as 8 in Figure 1. The cylindrical outer surface of nozzle 8 can be provided at its inner end with a threaded shoulder portion 36 whereby nozzle 8 can be fastened to the reduced aft portion 7 of Figure 1 by lock member 9. The inner wall of nozzle 8 is constricted as shown to provide Venturi-type passage 37, the smallest cross-sectional area of which is designated as the throat 38. The tapered inlet portion of the nozzle passage 37 upstream from throat 38 is known as the converging section of the passage, and the outlet portion of the passage downstream of the throat is known as the diverging section of the passage. The inner wall of nozzle 8 at the inlet end of passage 37 can be provided with an annular shoulder 39. The periphery of a thin blowout or starter disc 41 is brazed, welded, cemented or otherwise fastened to shoulder 39. Across the inlet end of passage 37 is a relatively thicker annular member 42, the inner face of which is adjacent to starter disc 41, this latter being preferably concave with respect to the inner face of member 42. Member 42, hereinafter referred to as the perforate or secondary starter disc, is provided with an axial perforation or orifice 43. The periphery of the inner face of secondary starter disc 42 is cemented or otherwise secured to the adjacent portions of the nozzle wall and starter disc 41, the latter hereinafter referred to as the primary starter disc. Members 41 and 42 in combination serve as a two-stage starter disc system.

The secondary starter disc 42 can be made of many different rigid materials, preferably having a heat distortion temperature greater than about 180° F. (ASTM Spec. D648) and can be reinforced with any type of reinforcement material. Secondary starter disc 42 is preferably made of rigid plastic materials such as acrylics, melamines, phenolics, furanes, polyamids, cellulose acetate butyrate, polyesters, epoxies, silicones, and the like; specifically materials having the following registered trademarks are especially useful: Nylon, Lucite, Plexiglas and Marlex. We have found in actual practice that Plexiglas is a very desirable material. The primary starter disc 41 can also be made from the above materials. In addition, the primary starter disc can also be made from aluminum or aluminum alloys, steel, copper or copper alloys, glass, rubber, and any other rigid or semi-rigid material.

Depending upon the size and geometry and other operational characteristics of the rocket motor, there will be an optimum burst pressure for the primary starter disc as well as for the secondary starter disc. We have found in actual practice that desirable optimum burst pressures for the primary and secondary starter discs are about 200–500 p.s.i. and about 900–1100 p.s.i., respectively. The thickness of the primary and secondary starter discs are regulated by the desired burst pressure of the discs, the seating or support diameter of the discs, and the physical properties of the materials used to fabricate the discs. The desired thickness of each disc can be determined experimentally by air burst tests in which conditions experienced in actual firings are simulated. The primary starter disc functions by rupturing, disintegrating, or simply by being ejected from the passage; all these manners of functioning are known in the art.

The orifice diameter in the secondary starter disc will vary with various rocket motor design parameters, the particular size selected being based on a disc that will erode and/or burn away in such a manner as to smooth out the pressure drop as the primary starter disc functions and yet not increase pressure and thrust transients when rocket motors are operated at higher temperatures. The initial orifice diameter of the secondary starter disc is such that it will provide an effective throat area which is smaller than the throat area defined by the constricted wall portion of the nozzle. This orifice has a relatively low flow coefficient as compared to the throat defined by the inner nozzle wall. We have found in actual practice, where the throat area defined by the inner nozzle wall was 1.000±0.003 inch, that the preferred diameter of the orifice in the secondary starter disc is slightly larger, viz., 1.031–1.096 inches. Orifices having diameters in the range of 0.750 to 1.250 inches have proven operable where the throat area defined by the inner wall of the nozzle was about 1.000±0.003 inch.

The location of the primary starter disc as well as the secondary starter disc in the Venturi-type passage of the nozzle can vary, except that the secondary starter disc must be upstream from the primary starter disc. Both discs can be located anywhere along the passage, for example, they can be located in the divergent section or the convergent section of the passage, providing the secondary starter disc is always upstream from the primary starter disc, and providing the design or arrangement allows the primary disc to rupture or burst first at a lower pressure than the secondary starter disc and the result of the rupture or bursting of the primary disc does not deter the operation of the secondary starter disc.

Figures 3, 4:
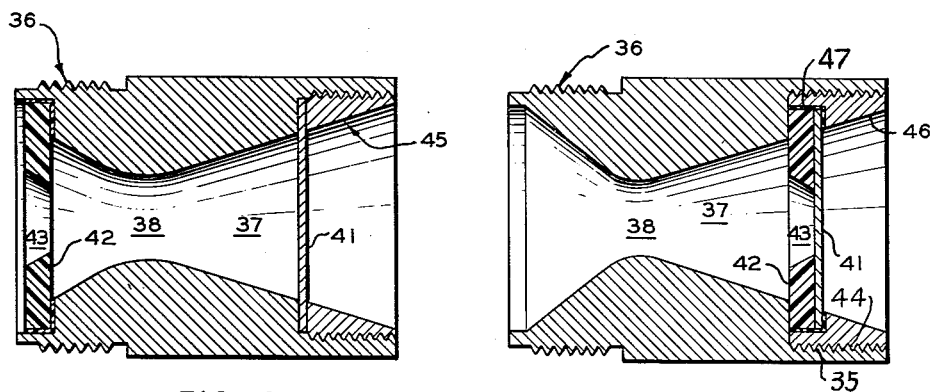
Figures 2, 3 and 4 are enlarged elevational views of nozzles, such as shown in Figure 1, illustrating various modifications of our invention.

Figure 2 illustrates the preferred arrangement of the primary disc 41 and secondary starter disc 42, that is, with both discs in the converging section of the Venturi-type passage 37. Figure 3 illustrates the arrangement where the primary starter disc 41 is located in the diverging section of the passage 37 and the secondary starter disc 42 is located in the converging section of the passage. Figure 4 illustrates the arrangement where both primary disc 41 and secondary starter disc 42 are located in the diverging section of the passage 37. Furthermore, Figure 4 shows a circumferential groove 47 in plug member 46, an exterior threaded section 44 on plug member 46, and an interior threaded section 35 in outlet nozzle 8. Although we prefer to have the diameter of the orifice in the secondary starter disc constant throughout, it is within the scope of our invention to have the diameter of the orifice in the secondary starter disc progressively decrease from the inlet end of the nozzle, such as illustrated by the outwardly tapered orifices in Figures 3 and 4.

In Figure 3, the primary starter disc 41 is held in place by nozzle plug member 45, while in Figure 4, both the primary and secondary starter discs are held in place by nozzle plug member 46. In both of these embodiments, the discs can be cemented or otherwise secured to adjacent portions of the nozzle as described hereinbefore.

The solid propellants for which the rocket motor of our invention is particularly adapted are composite-type propellants comprising a fuel or binder and an oxidant for oxidizing the fuel, although any type of solid propellant can be used. Particularly useful propellant compositions which may be utilized in the practice of this invention are of the rubbery copolymer-oxidant type which is plasticized and worked to prepare an extrudable mass at 130° to 175° F. The copolymer can be reinforced with suitable reinforcing agents such as carbon black, silica, and the like. Suitable oxidation inhibitors, wetting agents, modifiers, vulcanizing agents, and accelerators can be added to aid processing and to provide for the curing of the extruded grains of propellant at temperatures preferably in the range of 170° to 185° F. In addition to the copolymer binder and other ingredients, the propellant composition comprises an oxidant and a burning rate catalyst.

Solid propellant compositions particularly useful in the preparation of the grains used in this invention are prepared by mixing the copolymer with a solid oxidant, a burning rate catalyst, and various other compounding ingredients so that the reinforced binder forms a continuous phase and the oxidant a discontinuous phase. The resulting mixture is heated to effect curing of the same.

The copolymers are preferably formed by copolymerization of a vinyl heterocyclic nitrogen compound with an open chain conjugated diene. The conjugated dienes preferably employed are those containing 4 to 6 carbon atoms per molecule and representatively include 1,3-butadiene, isoprene, 2,3-dimethyl-1,3-butadiene, and the like. The vinyl heterocyclic nitrogen compound generally preferred is a monovinylpyridine or alkyl-substituted monovinylpyridine such as 2-vinyl pyridine, 3-vinylpyridine, 4-vinylpyridine, 2-methyl-5-vinylpyridine, 5-ethyl-2-vinylpyridine, 2,4-dimethyl-6-vinylpyridine, and the like. The corresponding compounds in which an alpha-methylvinyl (isopropenyl) group replaces the vinyl group are also applicable.

In the preparation of the copolymers, the amount of conjugated diene employed can be in the range between 75 and 95 parts by weight per 100 parts monomers and the vinyl heterocyclic nitrogen can be in the range between 25 and 5 parts. Terpolymers are applicable as well as copolymers and in the preparation of the former up to 50 weight percent of the conjugated diene can be replaced with another polymerizable compound such as styrene, acrylonitrile, and the like. Instead of employing a single conjugated diene compound, a mixture of conjugated dienes can be employed. The preferred, readily available binder employed is a copolymer prepared from 90 parts by weight of butadiene and 10 parts by weight of 2-methyl-5-vinylpyridine, hereinafter abbreviated Bd/MVP. This copolymer is polymerized to a Mooney (ML–4) plasticity value in the range of 10-40, preferably in the range of 15 to 25, and may be masterbatched with 5-20 parts of Philblack A, a furnace black, per 100 parts of rubber. Masterbatching refers to the method of adding carbon black to the latex before coagulation and coagulating to form a high degree of dispersion of the carbon black in the rubber. In order to facilitate dispersion of the carbon black in the latex Marasperse-CB, or similar surface active agent, can be added to the carbon black slurry or to the water used to prepare the slurry.

The following empirical formulation or recipe generally represents the class of propellant compositions preferred for the preparation of the grains of propellant of this invention:

Table I

| Ingredient | Parts per 100 parts of rubber | Parts by Weight |
| --- | --- | --- |
| Binder | | 10-25 |
| Copolymer (Bd/MVP) | 100 | |
| Philblack A (a furnace black) | 10-30 | |
| Plasticizer | 10-30 | |
| Silica | 0-20 | |
| Metal oxide | 0-5 | |
| Antioxidant | 0-5 | |
| Wetting agent | 0-2 | |
| Accelerator | 0-2 | |
| Sulfur | 0-2 | |
| Oxidant (ammonium nitrate) | | 75-90 |
| Burning rate catalyst | | 0-30 |

Suitable plasticizers useful in preparing these grains of propellant include TP-90-B (dibutoxyethoxyethyl formal supplied by Thiokol Corp.); benzophenone and Pentaryl A (monoamylbiphenyl). Suitable silica preparations include a 10-20 micron size range supplied by Davison Chem. Co.; and Hi-Sil 202, a rubber grade material supplied by Columbia-Southern Chem. Corp. A suitable anti-oxidant is flexamine, a physical mixture containing 25 percent of a complex diarylamine-ketone reaction product and 35 percent of N,N'-diphenyl-p-phenylenediamine, supplied by Naugatuck Chem. Corp. A suitable wetting agent is Aerosol-OT (dioctyl sodium sulfosuccinate, supplied by American Cyanamid Co.). Satisfactory rubber cure accelerators include Philcure 113 (SA-113 N,N-dimethyl-S-tertiary butylsulfenyl dithiocarbamate); Butyl-8 (a dithiocarbamate-type rubber accelerator supplied by R. T. Vanderbilt Co.); and GMF (quinone dioxime, supplied by Naugatuck Chem. Co.). Suitable metal oxides include zinc oxide, magnesium oxide, iron oxide, chromium oxide, or combination of these metal oxides. Suitable burning rate catalysts include ferrocyanides sold under various trade names such as Prussian blue, steel blue, bronze blue, Milori blue, Turnbull's blue, Chinese blue, new blue, Antwerp blue, mineral blue, Paris blue, Berlin blue, Erlanger blue, foxglove blue, Hamberg blue, laundry blue, washing blue, Williamson blue, and the like. Other burning rate catalysts such as ammonium dichromate, potassium dichromate, sodium dichromate, ammonium molybdate, and the like, can also be used.

The layer of restricting material can be made from any of the slow burning materials used for this purpose in the art, such as cellulose acetate, ethylcellulose, butadiene-methylvinylpyridine, copolymer, GR-S, natural rubber, and the like.

OPERATION

The operation of a rocket motor constructed in accordance with our invention will now be detailed, illustrative reference being made to Figures 1 and 2. Rocket motor 5 is armed by removing cover 33 from the igniter assembly and connecting the electrical connections thereof to an electrical power circuit. Upon closing of a suitable switch, electric current flows to the electro-responsive means, such as squibs, whereupon the igniter material in container 32 is ignited with the consequent production of igniter decomposition products. These products melt or otherwise rupture the coating on the container 32 and the igniter products flow into the combustion chamber 13, the introduction being primarily directed down through the axial perforation 16. The heat from these decomposition products is transferred to the exposed burning surface 17 of the grain 14, raising the surface temperature to an ignition temperature. Not all of the burning surface area is ignited in the same instant but after a certain period of ignition lag the entire burning surface area is ignited and a combustion or hot zone is established, at which point an equilibrium burning condition is initially attained and the ignition phase completed. Up to this time, of course, propellant material is being consumed with the consequent generation of gaseous products having high temperature and pressures. When the pressure in the combustion chamber 13 reaches a starter disc bursting pressure (e.g., 200 p.s.i.) the starter disc 41 bursts and because of orifice 43 there is a momentary high pressure drop across the nozzle passage 37. The effective throat area of the nozzle passage 37 at this time is determined by the initial diameter of orifice 43. The flow of gaseous products through the nozzle passage 37 causes the secondary starter disc 42 to erode and melt about the orifice 43 whereby the effective throat area of the nozzle passage 37 progressively increases until the gas flow is thereafter controlled solely by the throat 38 defined by the inner wall of the nozzle. At the higher temperatures, e.g., 170° F., the secondary starter disc 42 will erode or melt quicker than at lower temperatures, e.g., −75° F., and the secondary starter disc will hinder only slightly the initial flow of gases at this higher temperature since the erosion or melting action will take place more quickly. After a predetermined amount of the secondary starter disc has been eroded or melted, and certainly after it has been wholly disintegrated or consumed, the effective throat area of the nozzle passage 37 is thereafter determined solely by the diameter of the throat 38.

It is thus evident that the secondary starter disc minimizes the rate and magnitude at which the pressure in the combustion chamber drops following the functioning of the primary starter disc, which results in improved ignition characteristics by maintaining the chamber pressure at or near equilibrium operating pressure during the ignition phase. In the case of JATO units, this operating or working pressure may generally be in the range between 200 and 1500 p.s.i., preferably between 600 and 1200 p.s.i.

EXAMPLES

All of the aforementioned objects of our invention were realized by actual static firing tests with production size JATO units throughout a wide range of temperature conditions. These production units, as exemplified by Figure 1, measured about 35 inches in length and had an outer diameter of about 10.5 inches. These units were charged with internal-burning grains fabricated from propellant material such as that set forth in Table I. Igniter systems employed in these firing tests were those disclosed and claimed in the aforementioned co-pending U.S. application Serial No. 591,340, filed June 14, 1956 by B. R. Adelman. These production units were mounted on a thrust or test stand and fired while held stationary. Measurements of thrust and pressure quantities as a function of time were made as well as other operational quantities. Over 50 production units provided with the two-step starter disc system were fired at varying temperatures, e.g., −75° F., +60° F., +70° F., +160° F., and +175° F.

Forty-two firings were conducted at −65° F.; relevant mean results of these firings are set forth in Table II. Ten of these firings were conducted on rocket motors having a secondary starter disc with an orifice measuring 1⅛ inches and the remaining 32 of these firings were conducted on rocket motors with secondary starter discs having orifices measuring 1 1/16 ± 1/32 inch. Representative thrust and pressure characteristics of one of these firings (a rocket motor having a secondary starter disc with an orifice measuring 1 1/16 ± 1/32 inch orifice diameter) are illustrated in Figures 5A and 5B, low and high speed traces respectively.

Table II
Mean Firing Results at −65° F. of 42 JATOs Provided with Two-Step Starter Disc System

| Ignition delay ᵃ (ms.) | $P_a$ ᵇ (p.s.i.) | $F_2$ ᶜ (lb.) | $P_{max\ Ign}$ ᵈ (p.s.i.) | $P_{min\ Ign}$ ᵉ (p.s.i.) |
|---|---|---|---|---|
| 148 | 709 | 874 | 849 | 599 |

ᵃ Time from application of current to primary starter disc rupture.
ᵇ Primary starter disc rupture pressure.
ᶜ First thrust peak following primary starter disc rupture.
ᵈ Maximum pressure peak during ignition phase.
ᵉ Minimum pressure saddle following primary starter disc rupture.

Ten firings were also conducted at a temperature of +160° F.; relevant means results of these firings are set forth in Table III. All of these firings were conducted on rocket motors having a secondary starter disc measuring 1.125 inches in diameter. Representative thrust and pressure characteristics of one of these firings are illustrated in Figures 6A and 6B.

Table III
Mean Firing Results at +160° F. of 10 JATOs Provided with Two-Step Starter Disc System

| Ignition delay ᵃ (ms.) | $P_a$ ᵇ (p.s.i.) | $F_2$ ᶜ (lb.) | $P_{max\ Ign}$ ᵈ (p.s.i.) | $P_{min\ Ign}$ ᵉ (p.s.i.) |
|---|---|---|---|---|
| 56 | 671 | 1210 | 1404 | 652 |

ᵃ Time from application of current to primary starter disc rupture.
ᵇ Primary starter disc rupture pressure.
ᶜ First thrust peak following primary starter disc rupture.
ᵈ Maximum pressure peak during ignition phase.
ᵉ Minimum pressure saddle following primary starter disc rupture.

For purposes of comparison, rocket motors of this invention were fired and compared with the firings of similar rocket motors provided only with a primary starter disc. Figures 7A and 7B illustrate the representative thrust and pressure characteristics of a rocket motor provided with only a primary starter disc fired at +170° F. A rocket motor of this invention also similarly fired at this temperature and its thrust and pressure characteristics are illustrated in Figures 8A and 8B. A comparison of the curves of Figures 7A, 7B and 8A, 8B show that the secondary starter disc does not add to the magnitude of the pressure transient in the +170° firings comparing the 1,380 p.s.i. peak (point 51 in Figure 7B) with the 1,390 p.s.i. peak (point 52 in Figure 8B). It is known that pressure transients exceeding 1,850 p.s.i. have been obtained with rocket motors provided only with a primary starter disc and fired under similar conditions at +170° F. It is also to be noted that in Figures 8A, 8B there is a complete absence of any starter disc shock; the 1,790 p.s.i. peak (point 53 in Figure 8B) and the next lower peak were caused primarily by igniter. The shock peak of 1,950 p.s.i. (point 54 in Figure 7B) was caused by the primary starter disc. In other words, the secondary starter disc eliminated the high thrust peaks which are inherently associated with the rocket motors provided only with a primary starter disc. The igniter used in the rocket motor having only a primary starter disc did not create much igniter shock; however, under similar conditions, igniter shocks of a magnitude of 1,800 pounds have been recorded, and it is therefore reasonable to conclude that had the igniter that was used in the rocket motor provided with only a primary starter disc been used in the rocket motor of this invention, the thrust curve would have been much smoother.

Figures 9A and 9B illustrate representative thrust and pressure characteristics of a rocket motor provided with only a primary starter disc and fired at −75° F. The thrust and pressure characteristics of a rocket motor of this invention provided with a two-step starter disc system fired at this temperature are illustrated in Figures 10A and 10B. A comparison of curves of Figures 9A, 9B, and 10A, 10B indicates that the rocket motors of this invention exhibited no misfires at −75° F. The 327 and 1,105 p.s.i. pressure peaks (points 56 and 57 respectively in Figure 10A) were the result of the primary and secondary starter discs, and although the pressure dropped to 150 p.s.i., the secondary starter disc restricted flow with a consequential pressure built up and thus prevented a misfire or hangfire. The firing of the rocket motor provided with only a primary starter disc, as illustrated in Figures 9A, 9B wherein the primary starter disc burst at 200 p.s.i., resulted in a 35 second hangfire when the chamber pressure dropped to atmospheric conditions after the primary starter disc burst. All the comparative curves of Figures 7 to 10 amply demonstrate the superiority of the rocket motors made according to our invention over the rocket motors provided with only primary starter discs throughout a wide range of temperature conditions.

Various modifications and alternatives of our invention will become apparent to those skilled in the art; and it is to be understood that the foregoing discussion and drawing merely illustrated preferred embodiments of our invention and do not necessarily limit the same.

We claim:

A rocket motor comprising: a tubular casing defining a cylindrical combustion chamber adapted to be loaded with a charge of solid propellant; an outlet nozzle secured to the aft end of said casing and forming a Venturi-type passage between the ends thereof, with a constricted throat in axial alignment with said chamber for the discharge of gaseous products therefrom; said outlet nozzle provided with an interior threaded screw section within said passage, a nozzle plug member provided with an exterior threaded screw section, a circumferential groove in the interior portion of said plug member, said exterior threaded section being engageable with said interior threaded section; an imperforate, disc-shaped, blowout member inserted within said groove and mounted substantially normal to the axis of said passage to obturate the same; and a perforate disc inserted within said groove adjacent to said blowout member and mounted normal to the axis of said passage at a point in said passage removed from said constricted throat and upstream from said blowout member and operative to minimize the rate and magnitude of the pressure drop in said chamber following the functioning of the said blowout member, said perforate disc having an orifice in axial alignment with said passage and said orifice adapted to progressively increase in size due to the eroding and melting action of said discharge of gaseous products therethrough during the ignition phase of said propellant, thereby maintaining the pressure in said chamber substantially at equilibrium operating pressure during said phase, after which the effective throat area is determined solely by the constricted throat of said passage.

References Cited in the file of this patent

UNITED STATES PATENTS

| | | |
|---|---|---|
| 1,504,144 | Romberg | Aug. 5, 1924 |
| 2,206,057 | Skinner | July 2, 1940 |
| 2,489,953 | Burney | Nov. 29, 1949 |
| 2,579,323 | Kessenich | Dec. 18, 1951 |
| 2,645,999 | Bogard | July 21, 1953 |
| 2,693,757 | Brandt | Nov. 9, 1954 |